(12) United States Patent
Palliser

(10) Patent No.: US 6,641,078 B2
(45) Date of Patent: Nov. 4, 2003

(54) SEAT BELT RETRACTOR WITH AUTOMATIC LOCKING MECHANISM

(75) Inventor: Martyn Palliser, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 49 days.

(21) Appl. No.: 10/119,081

(22) Filed: Apr. 10, 2002

(65) Prior Publication Data

US 2003/0057313 A1 Mar. 27, 2003

(30) Foreign Application Priority Data

Sep. 27, 2001 (EP) .......................................... 01308212

(51) Int. Cl.[7] .......................................... B60R 22/415
(52) U.S. Cl. .................................................. 242/382.2
(58) Field of Search ...................... 242/382.2; 280/806; 297/478

(56) References Cited

U.S. PATENT DOCUMENTS

| 4,811,912 A | | 3/1989 | Takada ..................... 242/107.4 |
| 4,817,885 A | * | 4/1989 | Matsumoto ............... 242/382.2 |
| 4,948,066 A | * | 8/1990 | Matsumoto et al. ...... 242/382.2 |
| 5,518,197 A | * | 5/1996 | Gray ........................ 242/382.2 |
| 5,931,401 A | | 8/1999 | Rink .......................... 242/374 |
| 6,405,963 B1 | * | 6/2002 | Specht et al. ............. 242/382.2 |

* cited by examiner

*Primary Examiner*—Kathy Matecki
*Assistant Examiner*—Sang Kim
(74) *Attorney, Agent, or Firm*—Lonnie Drayer

(57) ABSTRACT

A seat belt retractor has a rotatably mounted spool for supporting seat belt webbing. An emergency locking mechanism selectively locks the spool against rotation. An automatic locking mechanism selectively locks the spool against paying out webbing. A switch has a first position for activating the automotive locking mechanism in dependence upon a predetermined amount of webbing being wound off the spool, and a second position for deactivating the automatic locking mechanism in dependence upon a predetermined amount of webbing being wound back onto the spool. A gear connects the spool with the switch mechanism having a first and a second actuator tab on the gear. A pivotally mounted actuator member has an actuator pawl for locking the spool and parts engaging with the first and second tabs to move the switch between the first and second positions. The tabs and the engaging parts are radially oriented in line, one with the other.

8 Claims, 5 Drawing Sheets

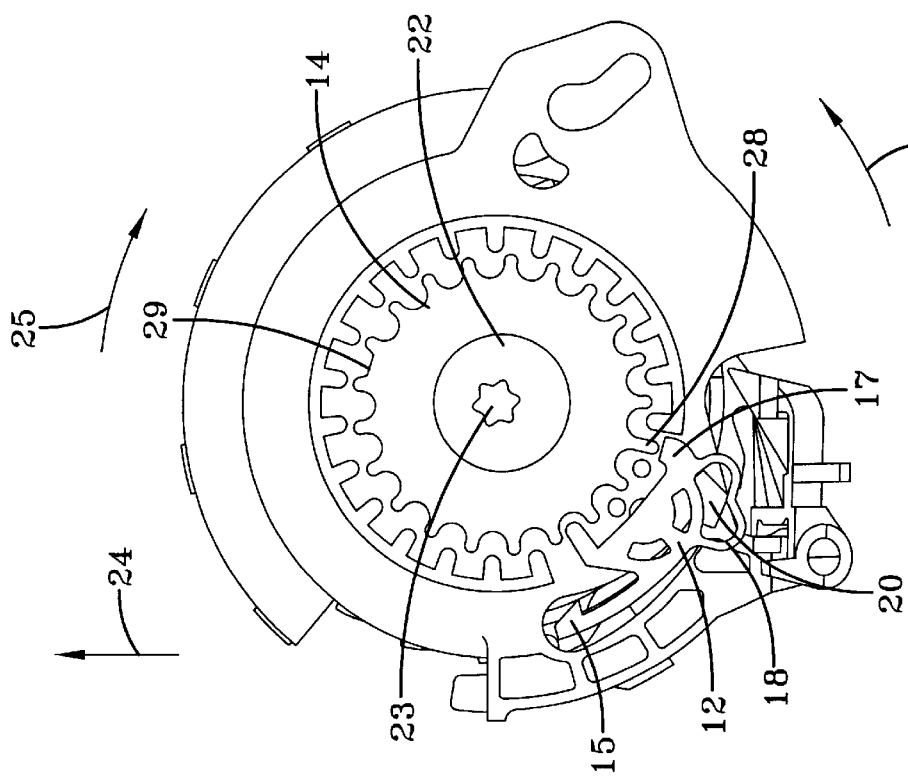
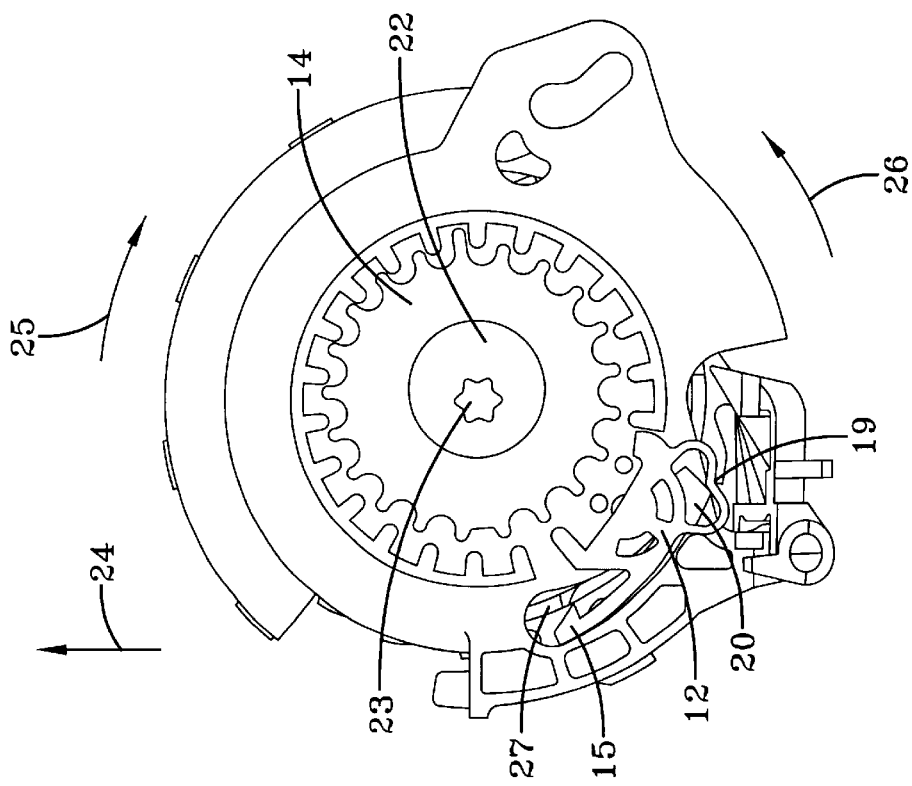

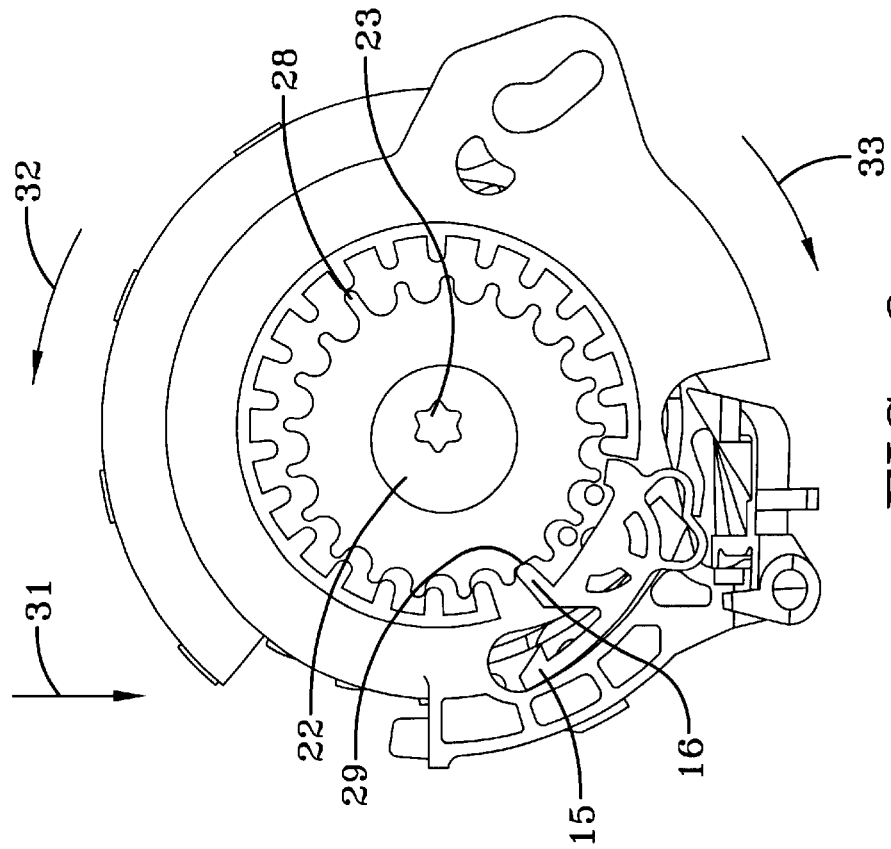
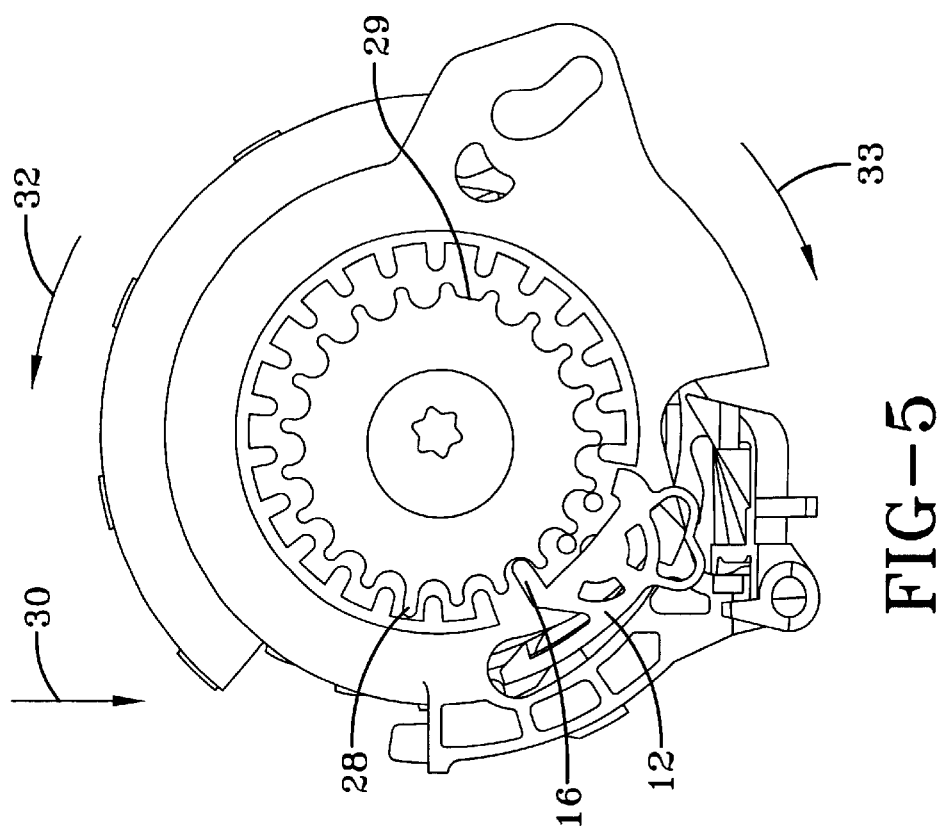

SEAT BELT RETRACTOR WITH AUTOMATIC LOCKING MECHANISM

FIELD OF THE INVENTION

The present invention relates to a seat belt retractor with an automatic locking mechanism.

BACKGROUND OF THE INVENTION

A conventional seat belt retractor passes around a vehicle occupant's body and effects a positive restraining force in an emergency by locking to prevent belt protraction when emergency conditions are detected by sensors in the seat belt retractor. Under non-emergency conditions, the seat belt retractor allows seat belt webbing to be paid out permitting the vehicle occupant to move relatively freely in the seat.

A problem arises when a child seat is to be attached in a vehicle seat fitted with such a seat belt retractor since safety regulations require the child seat be fixedly mounted in the vehicle and thus the seat belt retractor must be permanently in a locked condition. Thus, seat belt retractors have been produced with an automatic locking mechanism that can be engaged when a child seat is to be installed. Usually, the automatic locking mechanism is engaged by pulling out a predetermined amount of webbing, generally of the order of a least 90% of the webbing wound on the retractor. This action activates the automatic locking mechanism that locks the seat belt retractor against pay out but allows the webbing to be retracted so that the belt can be adjusted to the correct size for the child seat. The automatic locking mechanism is disengaged when the webbing is fully wound back onto the seat belt retractor.

DISCUSSION OF THE PRIOR ART

Various mechanisms for an automatic locking mechanism have been proposed. All require some form of step-down gearing to translate a large number of turns of a retractor spool, as the webbing is unwound into a much smaller number of turns of a member which actuates the automatic locking mechanism. A cycloidal gear arrangement is particularly suitable. One such arrangement is described in U.S. Pat. No. 5,518,197 which uses a cycloidal gear arranged to rotate at a slower speed than the retractor spool. An actuator pawl is biased by a spring to two separate positions. One position moves a locking pawl to engage a ratchet and stop further protraction of the webbing from the spool. In the other position the actuator pawl has no effect and the seat belt retractor is free to operate in an emergency locking mode as normal. An axially extending actuator tab on the cycloidal gear moves the actuator lever between the two positions.

SUMMARY OF THE INVENTION

There is provided in accordance with the present invention a seat belt retractor comprising: a rotatably mounted spool for supporting seat belt webbing; an emergency locking mechanism for selectively locking the spool against rotation; an automatic locking mechanism for selectively locking the spool against pay out of the webbing; a switch having a first position for activating the automatic locking mechanism in dependence upon a predetermined amount of webbing being wound off the spool; a second position for deactivating the automatic locking mechanism in dependence upon a predetermined amount of webbing being wound back onto the spool; a gear for connecting the spool with the switch mechanism; the switch mechanism comprising a first and a second actuator tab on the gear; and a pivotally mounted actuator member; having an actuator pawl for locking the spool and parts engaging with the first and second tabs to move the switch between the first and second positions, wherein the tabs and the engaging parts are radially oriented in line, one with the other.

BRIEF DESCRIPTION OF THE DRAWINGS

FIGS. 3 to 7 are put cut-away side views of the seat belt retractor of FIGS. 1 and 2 showing the sequence of operation.

DETAILED DESCRIPTION OF THE INVENTION

Figure 1:
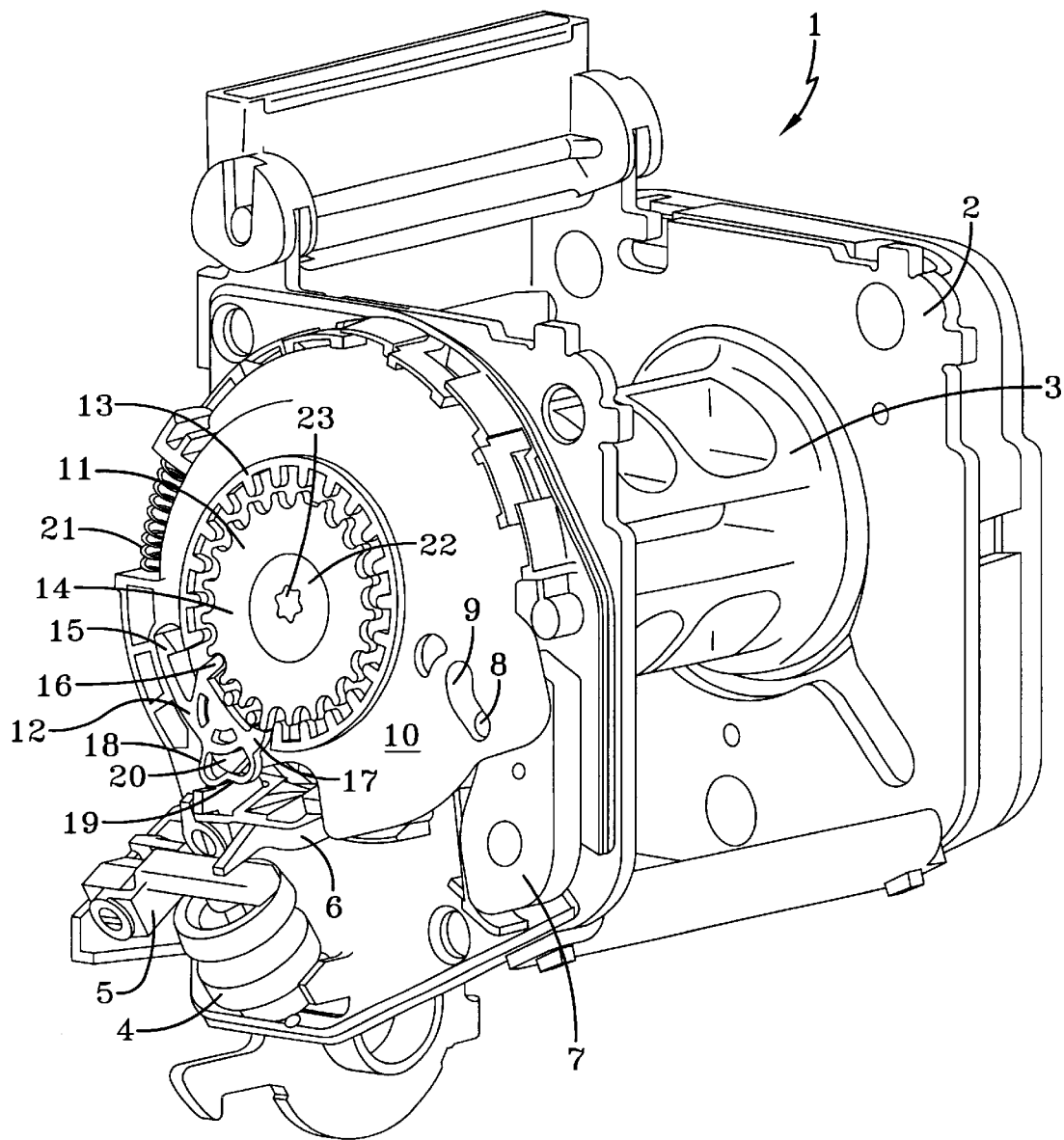
FIG. 1 is a perspective view of a seat belt retractor according to the present invention.
Figure 2:
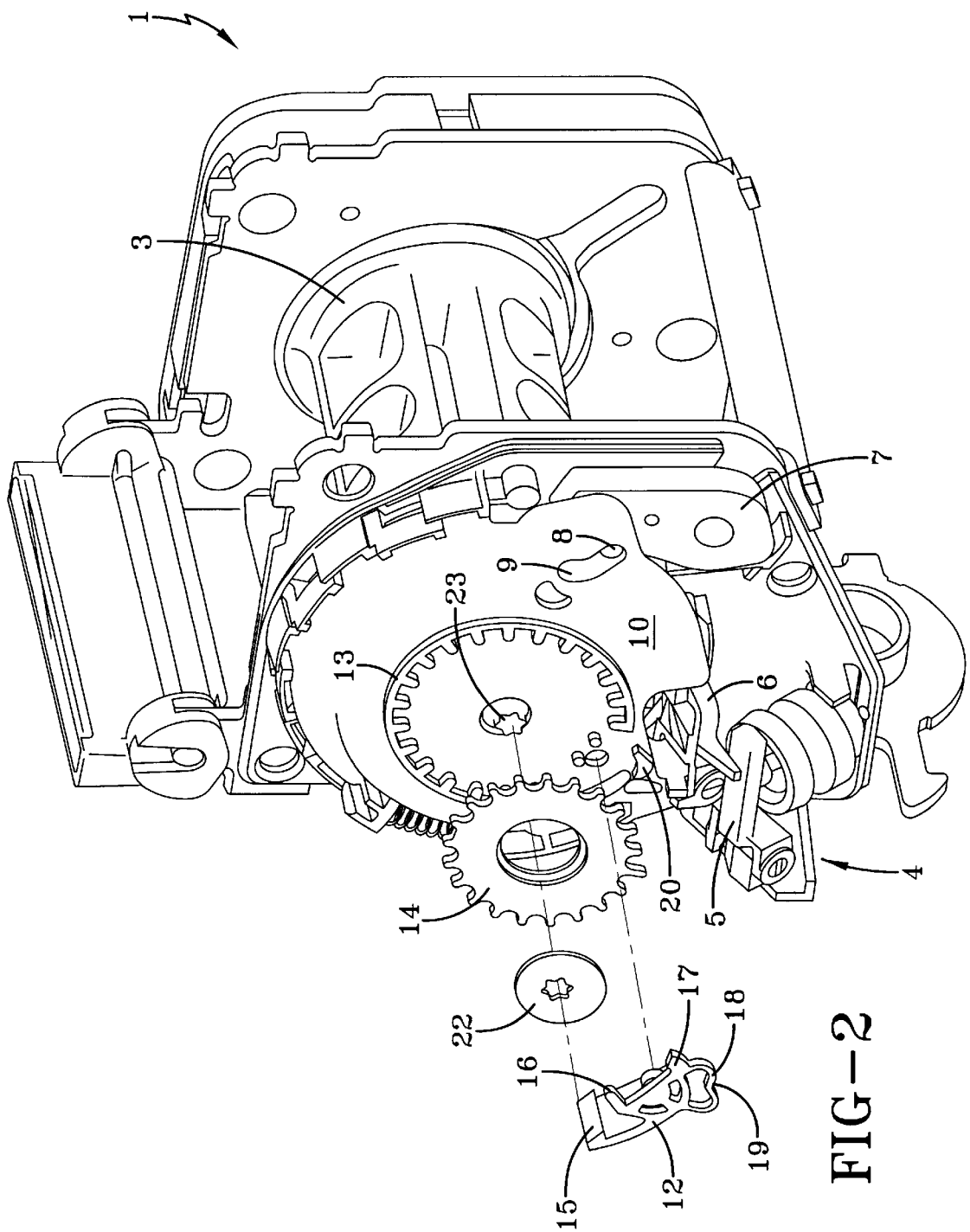
FIG. 2 is an exploded view of the seat belt retractor of FIG. 1.
Figure 7:
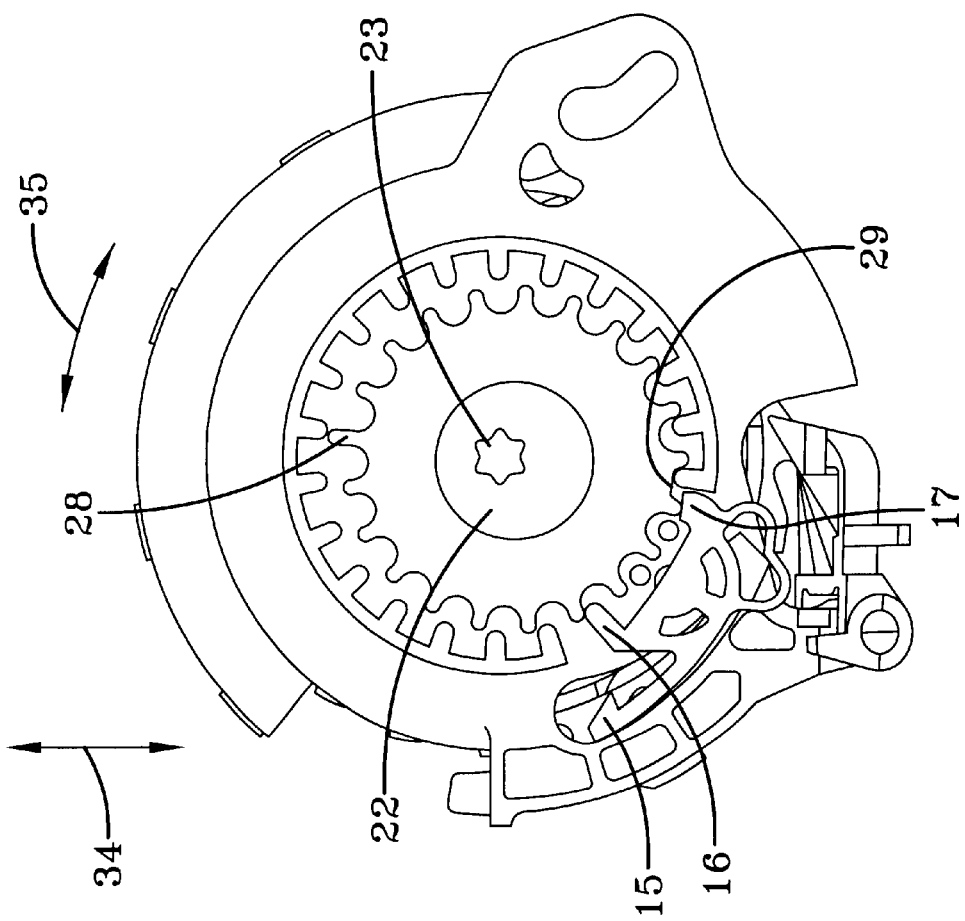

FIG. 1 is a perspective view of a seat belt retractor according to the present invention and FIG. 2 is an exploded view of the seat belt retractor of FIG. 1. A seat belt retractor 1 of generally known construction comprising a frame 2, a spool 3 and an emergency locking system attached to the left hand side of the frame.

The emergency locking system is of generally known construction and comprises a vehicle sensor 4 of a type known conventionally as a standing man, a vehicle sensor pawl 5 and a vehicle sensor locking pawl 6. In an emergency situation, the standing man 4 tips due to acceleration or deceleration above a predetermined limit. This causes the sensor pawl 5 to rise which in turn pivots the locking pawl 6 into engagement with teeth on a ratchet wheel 27 fixedly connected to the spool 3. Engagement of the locking pawl 6 with the ratchet wheel 27 brings a load bearing lock dog 7 into engagement to lock the spool in a load bearing manner. The lock dog 7 is pivoted on the frame and is brought into engagement by the interaction of a cam 8 on the lock dog 7 and a cam slot 9 on a multi-function piece 10 on which the vehicle sensor 4 is mounted.

The automatic locking mechanism comprises a cycloidal gear arrangement 11 and an actuator member 12. The cycloidal gear arrangement 11 comprises an internally toothed gear ring 13 and an externally toothed gear wheel 14 mounted off-center from the gear ring 13 by an eccentric cam 22 cooperating with an eccentric cam drive 23. This translates the rapid movement of the spool 3 into a slower movement of the cycloidal gearwheel 14.

The actuator member 12 comprises an actuator pawl 15 at one end which is arranged to engage the ratchet wheel, two spaced teeth 16, 17 arranged to engage the external toothing on gear wheel 14 and a spring arrangement 18. The spring arrangement 18 is molded as part of the actuator member 12 and comprises a plastic loop with an indentation 19 therein. Inside the loop, abutting the indentation 19 is a pointed post member 20 that provides the working surface against which the spring arrangement 18 acts. The indentation 19 can be positioned on either side of the pointed post member 20 depending upon the direction of resilient bias required to be applied to the actuator member 12. A spring 21 biases the multi-function piece 10 to a position in which the lock dog 7 is not engaged with the ratchet wheel.

The operation of the seat belt retractor will now be described with reference to FIGS. 3 to 7.

FIG. 3 shows a stowed position of the seat belt retractor in a vehicle with a full spool of webbing and no engagement of the automatic locking mechanism. The seat belt retractor is therefore in emergency locking retractor (ELR) mode. Webbing is being pulled off the spool in the direction indicated by arrow 24. This results in the spool rotating in a clockwise direction as shown by arrow 25. The eccentric cam 22 therefore also rotates clockwise and thus the gear wheel rotates counter-clockwise. The eccentric cam 22 is mounted on the eccentric cam drive 23 fixed to the spool 3. This results in the gear wheel 14 rotating counter-clockwise in the direction of arrow 26.

As shown in FIG. 3, the actuation lever 12 is in such a position that the actuator pawl 15 is not engaged with the ratchet wheel 27 and the spring arrangement 18 is such that the indentation 19 sits on the right hand side, as shown in FIG. 3, of the peak of the pointed post member 20. Thus the actuator member 12 is biased in a counter-clockwise direction relative to its pivot. In this situation, webbing can be pulled in or out freely.

In FIG. 4, webbing is pulled off the spool in the direction indicated by the arrow 24 and the spool 3 and eccentric cam 22 are rotating clockwise in the direction indicated by arrow 25. The gear wheel 14 is rotating counterclockwise in the direction indicated by arrow 26.

The gearwheel 14 has generally evenly spaced teeth with two exceptions. One extra long tooth 28 extends radially beyond the extent of the other teeth and will be referred to as a first actuator tab. In addition, the space between two of the normal teeth is partly filled in to provide a second actuator tab 29. In the embodiment illustrated the first actuator tab 28 is diametrically opposed to the second actuator tab 29. However, both tabs may comprise partially filled-in spaces or elongated radially extending gear teeth.

In the position shown in FIG. 4, the first actuator tab 28 on the gear wheel 14 is in contact with a first leg 17 on the actuator member 12. This pushes the actuator member 12 against the force of the spring arrangement 18 in a clockwise direction about its pivot point. The first actuator tab 28 is dimensioned so as to rotate the actuator member 12 sufficiently far for the over-center spring to move over the switching point, for example, over the apex of the peaked pointed post member 20. In this position, the over-center spring engages the other side of the peaked pointed post member 20, which biases the actuator member 12 in a generally clockwise direction about its pivot point thus biasing the actuator pawl 15 into engagement with the ratchet wheel teeth. In this position, the seat belt retractor is in automatic locking retractor (ALR) mode since the spool is locked against further protraction of the webbing.

In FIG. 5, the seat belt retractor is working in automatic locking retractor (ALR) mode and webbing can only be drawn back onto the spool 3 in the direction indicated by arrow 30. The spool 3 and the eccentric cam 22 can only rotate counter-clockwise, in the direction indicated by arrow 32, and the gear wheel 14 can only rotate clockwise, in the direction indicated by arrow 33. The gear wheel 14 is shown in a position in which it has moved clockwise by about 90° compared to the position in FIG. 4. The gear wheel 14 continues to rotate clockwise until the second actuator tab 29 has moved around to engage the arm 16 of the actuator member 12. This is the position shown in FIG. 6. In this position, the second actuator tab 29 pushes against the engagement arm 16 urging the actuator member 12 to rotate counter-clockwise, in the direction indicated by arrow 32, against the force of the over-center spring 18. The geometry of the second actuator tab 29 and the engagement arm 16 is such that the actuator member 12 is pivoted sufficiently far for the actuator pawl 15 to disengage from the ratchet wheel 27. Thus the spool 3 is released and the ALR mode is switched off. The seat belt retractor is now in ELR mode again. It will also be seen that the indentation 19 of the over-center spring 18 has been pushed over the peak of pointed post member 20 and the actuator member 12 is again biased in a generally counter-clockwise direction so that actuator pawl 15 is biased out of engagement with the ratchet wheel 27.

In this position, webbing can be pulled off the spool or wound back onto the spool, as indicated by double headed arrow 34, and the eccentric cam together with the gear wheel can rotate freely in any direction, as indicated by the double headed arrow 35. This is the position shown in FIG. 7.

The low number of extra elements required in this arrangement means that the package size of the seat belt retractor is much slimmer than previous designs. This is because both activation and deactivation are performed with tabs that are all provided in a single layer.

An alternative would be to use elongated teeth for both actuator tabs or to use filled teeth roots for both actuator tabs. A multitude of arrangements can be envisaged by a person skilled in the art with appropriate adjustment to the geometry of the arms of the actuator member.

Many changes and modifications in the above described embodiment of the invention can, of course, be carried out without departing from the scope thereof. Accordingly, that scope is intended to be limited only by the scope of the appended claims.

I claim:

1. A seat belt retractor comprising:
   a rotatably mounted spool for supporting seat belt webbing;
   an emergency locking mechanism for selectively locking the spool against rotation;
   an automatic locking mechanism for selectively locking the spool against pay out of the webbing;
   a switch having a first position for activating the automatic locking mechanism in dependence upon a predetermined amount of webbing being wound off the spool;
   a second position for deactivating the automatic locking mechanism in dependence upon a predetermined amount of webbing being wound back onto the spool;
   a gear for connecting the spool with the switch mechanism;
   the switch mechanism comprising a first and a second actuator tab on the gear; and
   a pivotally mounted octuator member having an actuator pawl for locking the spool and two spaced teeth engaging with the first and second tabs to move the switch between the first and second positions, wherein the tabs and said two spaced teeth are radially oriented in line, one with the other.

2. The seat belt retractor according to claim 1 wherein the gear is a cycloidal gear arrangement.

3. The seat belt retractor according to claim 2 wherein the first tab comprises a radially extending elongated gear tooth and the second tab comprises a partially filled-in space between the two gear teeth.

4. The seat belt retractor according to claim 2 wherein both tabs comprise partially filled-in space between the adjacent gear teeth.

5. The seat belt retractor according to claim 2 wherein both tabs comprise elongated radially extending gear teeth.

6. The seat belt retractor according to claim 1 wherein the first tab comprises a radially extending elongated gear tooth and the second tab comprises a partially filled-in space between the two gear teeth.

7. The seat belt retractor according to claim 1 wherein both tabs comprise partially filled-in space between the adjacent gear teeth.

8. The seat belt retractor according to claim 1 wherein both tabs comprise elongated radially extending gear teeth.

* * * * *